United States Patent [19]

Suzuki et al.

[11] Patent Number: 4,506,155

[45] Date of Patent: Mar. 19, 1985

[54] METHOD AND APPARATUS USABLE WITH A CALIBRATION DEVICE FOR MEASURING THE RADIOACTIVITY OF A SAMPLE

[75] Inventors: Arata Suzuki, Ramsey, N.J.; William D. Allardice, Jr., Pittsburgh, Pa.

[73] Assignee: Capintec, Inc., Ramsey, N.J.

[21] Appl. No.: 420,636

[22] Filed: Sep. 21, 1982

[51] Int. Cl.[3] .............................................. G01D 18/00

[52] U.S. Cl. ................................ 250/252.1; 250/506.1

[58] Field of Search ............... 250/252.1, 505.1, 515.1; 414/8; 206/446

[56] References Cited

U.S. PATENT DOCUMENTS

| | | | |
|---|---|---|---|
| 4,084,097 | 4/1978 | Czaplinski et al. | 250/506.1 |
| 4,144,461 | 3/1979 | Glasser et al. | 250/506.1 |
| 4,268,755 | 5/1981 | Weber et al. | 250/506.1 |
| 4,382,512 | 5/1983 | Furminger | 250/506.1 |

*Primary Examiner*—Janice A. Howell

*Attorney, Agent, or Firm*—Fleit, Jacobson, Cohn & Price

[57] ABSTRACT

Method and apparatus of determining the radioactivity of a sample. The sample is contained in a vial located within a cannister having a body portion releasably engaged with a bottom portion. The apparatus includes a chuck for engaging and holding the bottom portion of the cannister and a lifting ring engageable with the body portion so that rotation of the lifting ring controls engagement and disengagement between the body and bottom portions of the cannister. After the chuck and cannister have been placed in a calibration device, the body portion is disengaged from the bottom portion by rotation of the lifting ring. The body portion is then moved by lifting the lifting ring so that the container is exposed and the radioactivity of the sample within the container can be measured. Subsequent lowering and rotation of the lifting ring reengages the body with the bottom of the cannister so that the sample is again shielded. The cannister and chuck are then removed from the calibration device.

14 Claims, 7 Drawing Figures

FIG. 2
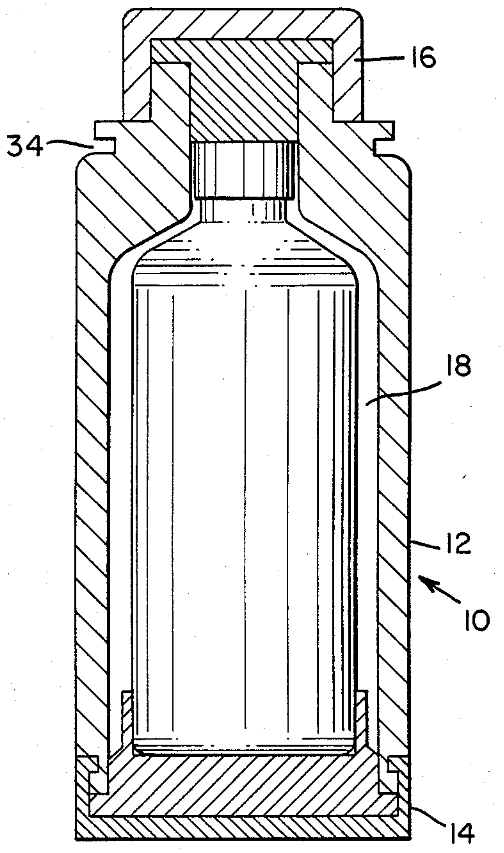
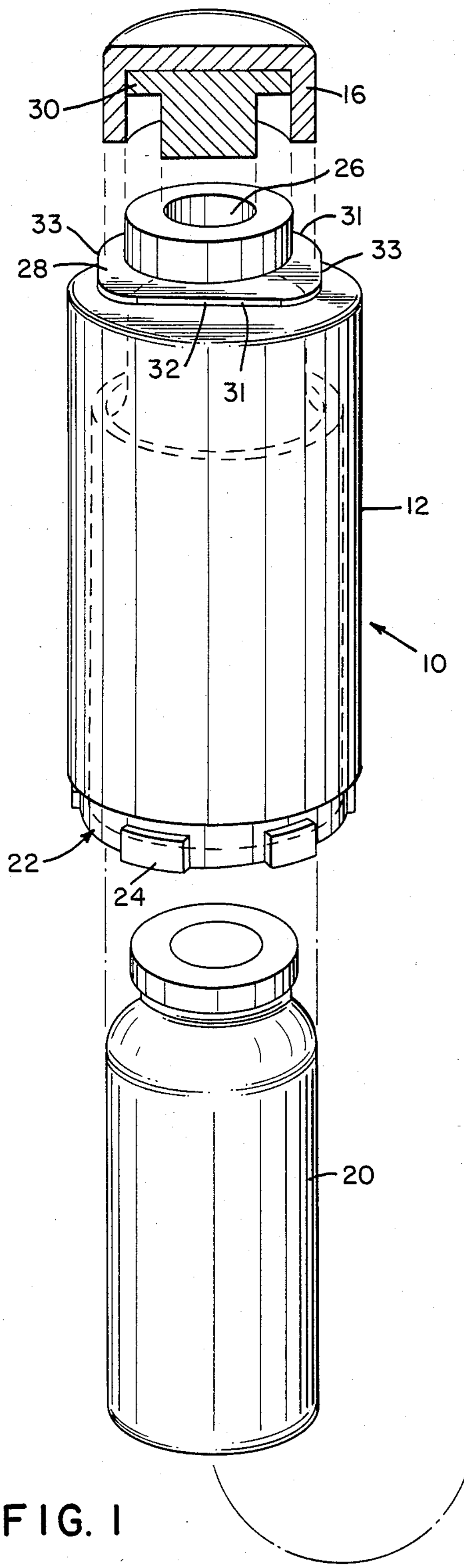
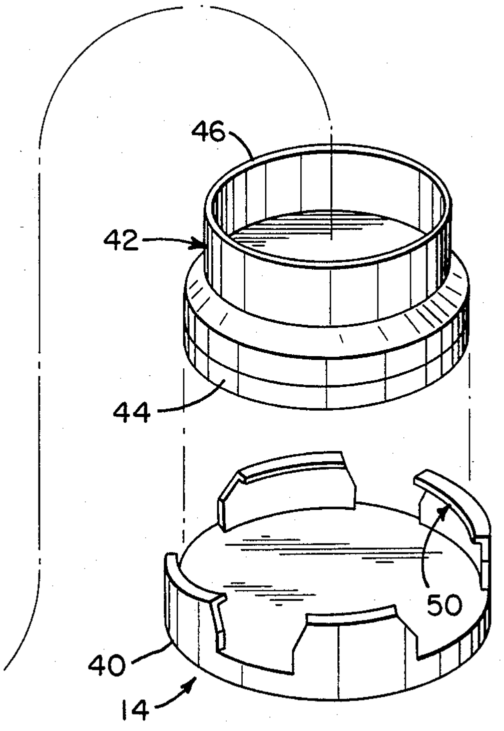
FIG. 1

METHOD AND APPARATUS USABLE WITH A CALIBRATION DEVICE FOR MEASURING THE RADIOACTIVITY OF A SAMPLE

BACKGROUND OF THE INVENTION

1. Field of the Invention

The present invention relates to a method and apparatus usable with a calibration device for measuring the radioactivity of a sample. More particularly, the invention provides a method for reducing unnecessary radiation exposure during the measurement of the radioactivity of a sample in a calibration device. Further, the invention provides an apparatus or device for handling a container of the radioactive material or solution so as to minimize unnecessary radiation exposure.

2. Description of the Prior Art

Reduction of unnecessary radiation exposure is a long recognized need. For instance, measurement of a very strong radionuclide source is often required in hospitals and radiopharmacies for diagnostics and/or therapy of patients. It is important to minimize exposure during such measurement.

Tc-99m (technetium-99m) is the most commonly used radionuclide in a hospital. Tc-99m is often obtained by eluting Mo-99 (molybdenum-99, a Tc generator). Eluate must be measured for its activity and for contamination by Mo-99 in order to ensure safety of the patient.

Dose calibrators (such as a radioisotope calibrator of the type manufactured by Capintec, Inc., of Ramsey, N.J.) are most commonly used to measure activity of radionuclide samples in a hospital. Mo-99 contamination in an eluted Tc-99m sample is often measured by a dose calibrator by placing the sample in a filter, such as a "Mo Assay Cannister".

These processes often necessitate handling of strong radionuclides, hence, exposure to strong radiation field. Activity of a strong Tc-99m source and Mo-99 contamination in the sample can be measured while the sample is shielded, when used in conjunction with a shielded dose calibrator, such as Capintec's models CRC-50, 30, and 10 calibrators.

A known handling apparatus uses a cannister having a cannister body engaged with a cannister base. The bottom of the cannister base is designed to cooperate with the floor of the calibration device so that the base remains stationary during rotation of the cannister body. After the body has been separated from the base, the body is removed from the calibration device so that a measurement can be performed. When the measurement is completed, the body is reinserted into the calibration device and rotated so as to engage the base.

Problems encountered with this system include realignment problems between the cannister body and base when the body is reinserted into the calibration device, and the necessity to apply both an axial force and a torque to the cannister body during engagement and disengagement of the cannister body from the base.

SUMMARY OF THE INVENTION

It is an object of the present invention to provide a method and an apparatus usable with a calibration device for measuring the radioactivity of a sample in which unnecessary radiation exposure is reduced.

The invention provides a method of determining the radioactivity of a sample contained in a container in which the container is placed in a base of a cannister. A cannister body is positioned over the container and rotated with respect to the base so that the base and lower edge of the body are releasably engaged with each other to thereby form an assembled cannister providing shielding for the sample. An upper portion of the assembled cannister is then engaged with a lifting ring of a handling apparatus or device so that rotation of the lifting ring rotates the cannister body and so that the cannister body is raised and lowered by corresponding movements of the lifting ring. The lifting ring is carried by a lifting rod that is in a raised position when the lifting ring is initially engaged with the cannister. Lowering of the lifting rod engages the cannister base with a chuck of the handling apparatus such that the chuck releasably holds and prevents rotation of the base. The assembled cannister and chuck of the handling device are then placed in an ionization chamber of a calibration device. Rotation of the lifting ring, preferably by rotation of the lifting rod, rotates the cannister body with respect to the base thereby disengaging the cannister body from the base. Raising of the lifting rod separates the disengaged cannister body from the cannister base thereby exposing the container for a calibration measurement. After measurement of the radioactivity of the sample, the lifting rod is lowered so that the body again contacts the base, and the lifting ring is rotated so that the lower edge of the body is releasably engaged with the cannister base. The chuck and assembled cannister are then removed from the calibration device.

The cannister provided by the present invention is designed to shield a collection vial or container while the vial is associated with an eluting Tc generator. Thus, there is no requirement to transfer a vial containing a sample of strong activity.

The invention also provides a handling apparatus for carrying an assembled cannister, shielding container. Such cannister has a cannister body releasably engaged with a cannister base, with the cannister base being shaped to support and hold a container of the radioactive material. The handling apparatus includes a chuck that receives and prevents rotation of the cannister base. A lifting ring is engaged with an upper portion of the assembled cannister so that rotation and translation of the lifting ring result in corresponding movements of the upper portion of the cannister. A lifting rod extends upwardly from the lifting ring so as to control movement of the lifting ring. A frame extends upwardly from the chuck and guides movement of the lifting rod. Preferably, the frame includes a top cover having an opening extending therethrough receiving and guiding movement of the lifting rod. In one embodiment, a cam handle is pivotally connected to an upper end of the lifting rod. The handle has a cam surface engaged with the top cover so that rotation of the cam handle in a plane containing the axis of the lifting rod controls raising and lowering movements of the lifting rod. Rotation of the cam handle about the axis of the lifting rod results in rotation of the lifting ring.

Advantages provided by the present invention include the following:

a. Provision of a shield that can be used while an elution is being collected from various types of Tc-99mm generators, without requiring transfer of a vial containing radioactive material having strong activity.

b. Use of a simple friction chuck mechanism to hold a cannister bottom and shield in place.

c. Provision of a cam mechanism to provide smooth engagement and disengagement of the assay cannister assembly with the friction chuck.

d. Use of a cam handle to ensure holding of the cannister body spaced from the vial during measurement of activity.

e. Use of the cannister to store prepared substances after the measurement operation.

The invention, and its objects and advantages, will become more apparent in the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which:

FIG. 1 is an exploded perspective of a cannister assembly according to one embodiment of the present invention;

FIG. 2 is a sectional view of the assembled cannister of FIG. 1;

DESCRIPTION OF THE PREFERRED EMBODIMENTS

Figure 3:
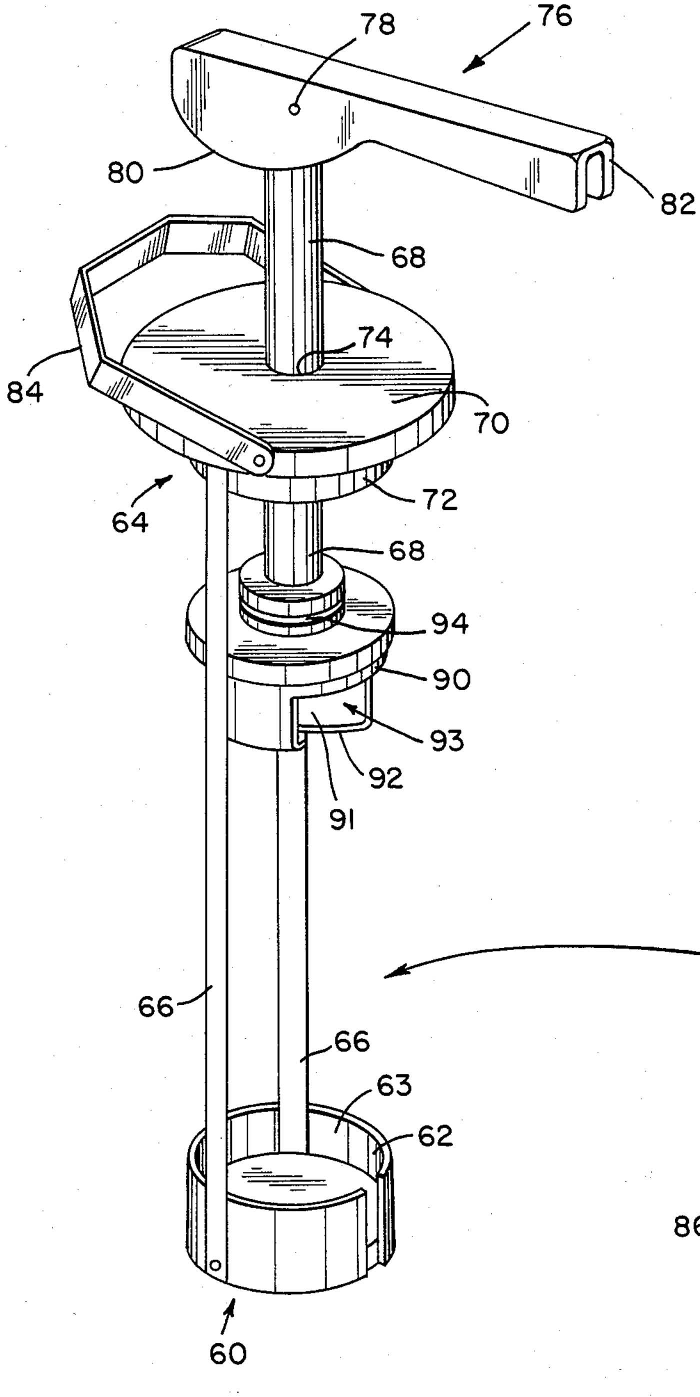
FIG. 3 is a perspective of a handling apparatus usable with the cannister of FIG. 1.

The present description will be directed in particular to elements forming part of, or cooperating more directly with, the present invention. Elements not specifically shown or described herein are understood to be selectable from those known in the art.

Referring now to the drawings, and to FIGS. 1 and 2 in particular, one embodiment of an assay cannister usable with the present invention is illustrated. The cannister, which is generally designated 10, includes a cannister body 12, a cannister bottom 14, and a shielding cap 16. The cannister body, in one embodiment, is formed of lead and has a wall thickness of approximately 0.300 inches. The walls of the body 12 define an interior cavity 18 shaped to generally conform with the exterior configuration of a vial or container 20 for a radioactive sample. A lower end 22 of the body 12 is formed with first components of complimentary fastening means, such as protrusions or threads 24. An opening 26 is defined in a central portion of the upper surface 28 of the cannister body 12. Such opening is closed by a plug 30 housed within shielding cap 16. The peripheral edge surface 32 of the upper surface 28 is spaced from a lower portion of the body 12 so as to define a groove 34 which cooperates with a cannister lifting mechanism in a manner to be described in greater detail hereinafter.

The cannister bottom 14 is a composite member formed from a bottom cup 40 and a combination container holder and vial spacer 42. A lead shield 44 is attached to the bottom of the holder 42. Alternatively, the shield 44 is formed as part of the bottom cup 40. A circumferential side wall 46 of the holder 42 defines an interior recess for receiving and supporting the vial 20. Preferably, the holder 42 is releasably engaged with the cup 40 so that the holder is easily removed from the cup. When a different size container is to be associated with the base, all that is necessary is to insert in the cup a holder with an appropriately sized cavity.

The bottom cup 40 also has a component of complimentary fastening means engagable with the protrusions or threads 24 of the body 12. FIG. 1 illustrates such complimentary fastening components as inwardly extending projections 50. The relationship between the protrusions 24 and the projections 50 is such that the cannister body 12 is releasably engaged with the bottom 14 by a relative rotation of approximately 30°. Such engagement is clearly illustrated in FIG. 2.

Referring to FIG. 3, an embodiment of a cannister lifting mechanism or handling device usable with the cannister 10 is illustrated. The apparatus, which is generally designated 60, includes a chuck 62 formed from nylon or other suitable material, a top cover assembly, generally designated 64, and connecting rods or guide rails 66 formed from brass or other suitable material. The top cover assembly 64 and the rod 66 form frame means extending upwardly from the chuck that guide movement of a lifting rod 68, which is preferably a nylon rod.

The top cover assembly 64 includes a top cover nylon plate 70, a lower inside plate 72, and a top lead liner (not illustrated) interposed between the members 70 and 72. A central opening 74 extends through the top cover assembly 64. The rod 68 extends through the opening 74 and is guided by portions of the cover assembly defining the opening.

A cam handle, generally designated 76, is connected by a pivot pin 78 to an upper end of the lifting rod 68 so that the handle is movable in a plane containing the axis of the lifting rod 68. Further, the rod 68 is rotatable about its longitudinal axis by rotation of the cam handle. The cam handle 76 includes a cam surface having a first portion 80 spaced a minimum distance from pivot pin 78 and a second portion 82 spaced a maximum distance from pivot pin 78. The function of these cam surfaces will be described in more detail hereinafter.

Preferably, as illustrated in FIG. 3, a carrying handle 84 formed from aluminum or other suitable material is connected to the top cover 70. Provision of the carrying handle 84 separate and distinct from the cam handle 76 facilitates transport of the apparatus 60 when carrying a cannister 10.

The handle 84 facilitates insertion and removal of the apparatus and cannister from the calibration device and transportation to and from the calibration device. There is no need to grasp the cam handle 76, which might result in inadvertent separation of the canister bottom from the chuck 62.

Figure 4:
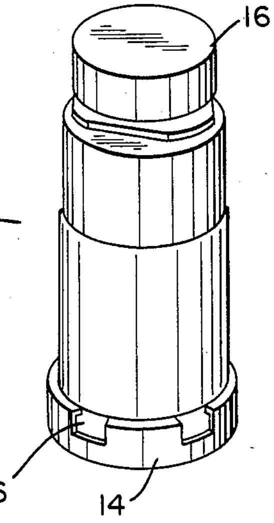
FIG. 4 is a schematic representation of the assembled cannister of FIG. 1.

The chuck 62 has a circumferential side wall 63 defining an interior cavity shaped to mate with and releasably hold the bottom 14 of the assembled cannister 10. Such engagement can be frictional engagement between confronting surfaces of the chuck and bottom. Alternatively, notches 86, as illustrated in FIG. 4, are provided in the cannister bottom that are engageable with mating protrusions (not shown) formed in the chuck. It should be readily appreciated that other types of complimentary fastening devices are usable to prevent rotation of the bottom 14 with respect to the chuck 62. Preferably, the upper portion of the wall of the chuck is tapered outwardly to facilitate insertion of the bottom 14 into the chuck. Also, it is preferable for the lower ends of the rods 66 to be connected to the base of the chuck in such manner that the inside surfaces of the rods are coextensive with the wall 63 of the chuck so that the rods guide movement of the cannister into and out of the chuck. In this manner, realignment of the body 12 with the bottom 14 upon completion of calibration of a sample is facilitated.

A lower end of the lifting rod 68 is connected to a twist and lifting ring 90. The ring 90 has inwardly facing lower surfaces 92 designed to mate with the groove 34 provided in the top of the cannister body 12. In like manner, opposed parallel surfaces 91 are defined in the lifting ring 90. The surfaces 91 are spaced from each other a sufficient distance to define a channel 93 sized to slidingly engage the pair of opposed parallel edges 31 or 33 defined by the peripheral edge surface 32. This engagement fixes the cannister 10 relative to the cam handle 76 so that rotation of the lifting rod 68 produces a corresponding rotation of the cannister body 12. Preferably, a retaining ring groove 94 is provided in the ring 90 to facilitate use of the apparatus 60 with certain types of elution devices, cannisters, and calibration devices.

An example will now be provided of the use of the present invention in conjunction with the measurement of the radioactivity of a sample. Initially, a vial 20 is positioned in the recess of the holder 42. Frictional engagement between side walls of the vial and the holder ensures proper positioning of the vial within the holder. The cannister body 12 is then positioned over the vial and threadedly engaged with the bottom 14 by turning of the cannister body by approximately 30°. The assembled assay cannister, with the collection vial, is then placed on a Tc-99m generator so that a sample can be inserted into the vial. After elution is collected, the assay cannister is removed from the generator and the shielding cap 16 is placed on the body 12 to completely shield the sample in the cannister. As illustrated in FIG. 4, the cap 16 is positioned so as not to interfere with access to the groove 34.

Figure 5:
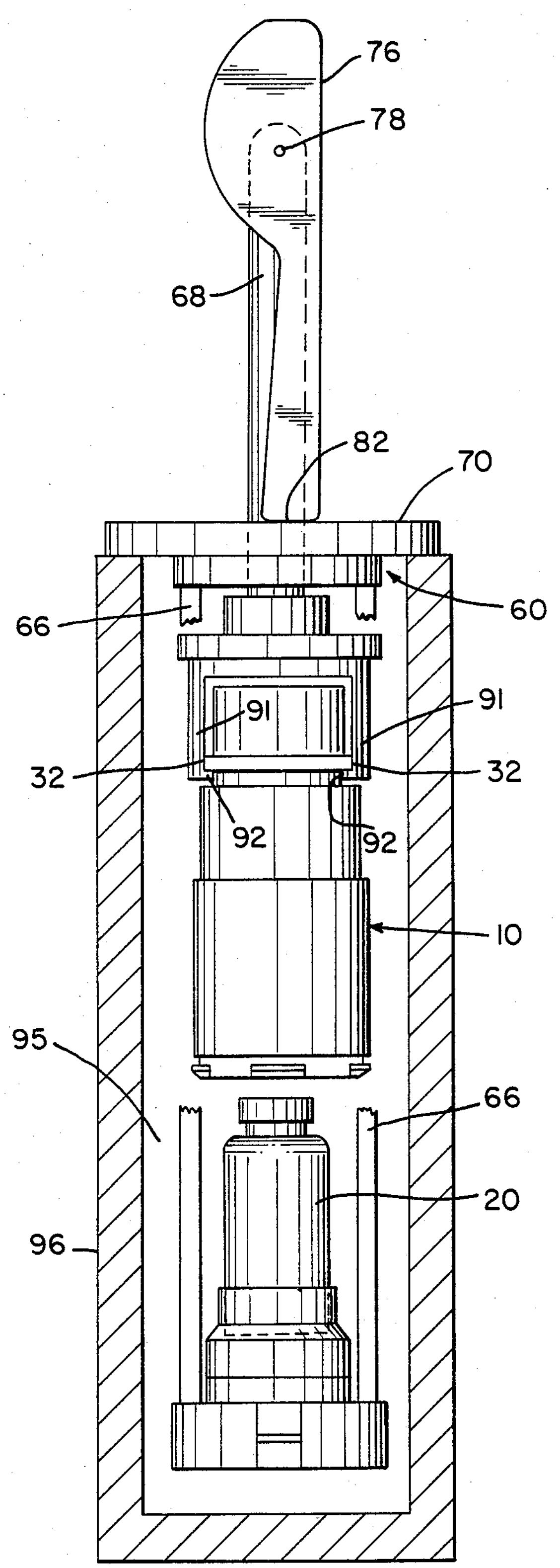
FIGS. 5 to 7 are schematic illustrations of the use of the present invention to determine the radioactivity of a sample.
Figure 7:
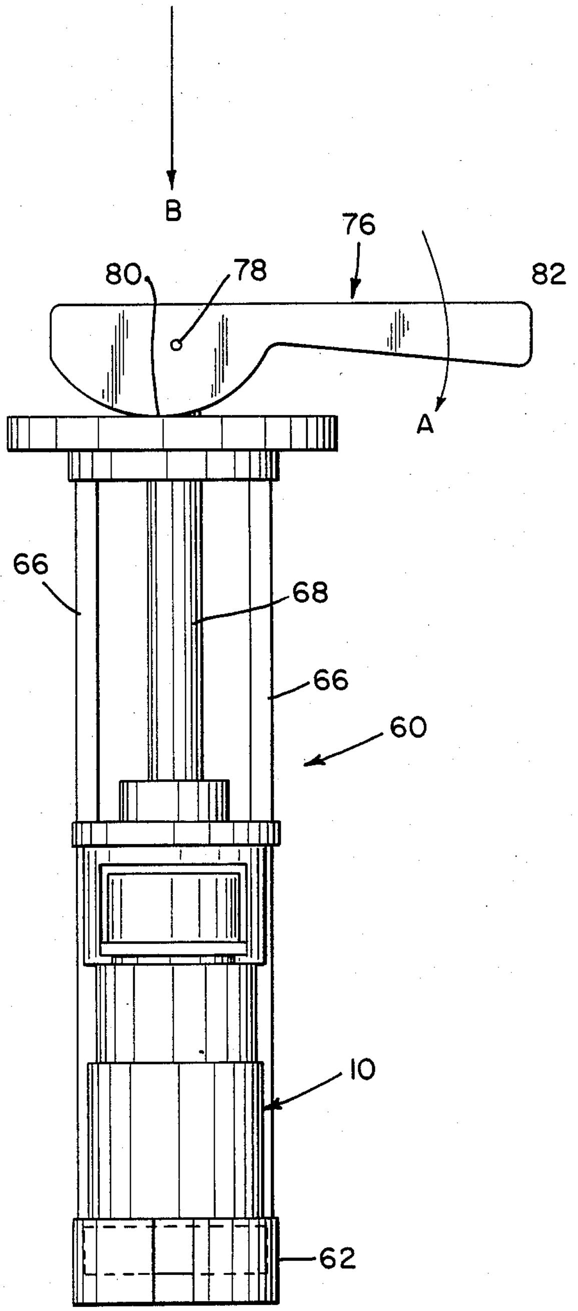

Initially, the cam handle 76 is rotated to move the ring 90 away from the bottom 14. The second or flat portion 82 of the cam surface is engaged with an upper surface of the top cover 70, as illustrated in FIG. 5, so as to hold the lifting rod 68 in a raised position. Lower surfaces 92 of ring 90 are then positioned in groove 34 and the peripheral edge surface 32 is slid into channel 93 so that the cannister 10 is secured to the carrying apparatus 60. The bottom 14 of the cannister 10 is then inserted into the chuck 62 by compression of the cam handle 76 hence of the lifting rod 68 in the direction of arrow B, as illustrated in FIG. 7. Preferably, a small gap (not illustrated in FIG. 7) is provided between the cam surface 80 and the top surface of the cover assembly 64 when the cannister bottom 14 is properly positioned in the chuck 62.

After the cannister 10 has been secured to the apparatus 60, with the bottom 14 being received in the chuck 62, the chuck 62 and cannister 10 are positioned in the interior cavity 95 of a conventional calibration device 96. The bottom surface of the cover 70 rests on the top surface of side walls of the ionization chamber of the calibration device so that the cannister lifting mechanism, with the exception of the cam handle 76, is located within the ionization chamber during operation. As illustrated in the drawing, the bottom surface of the chuck 62 is spaced from the floor of the ionization chamber.

Subsequent rotation of the cam handle 76 in a plane containing the axis of the pin 78 results in disengagement of the protrusions or threads 24 formed on the lower end of the bottom 12 from the complimentary shaped protrusions or threads 50 of the bottom 14.

Figure 6:
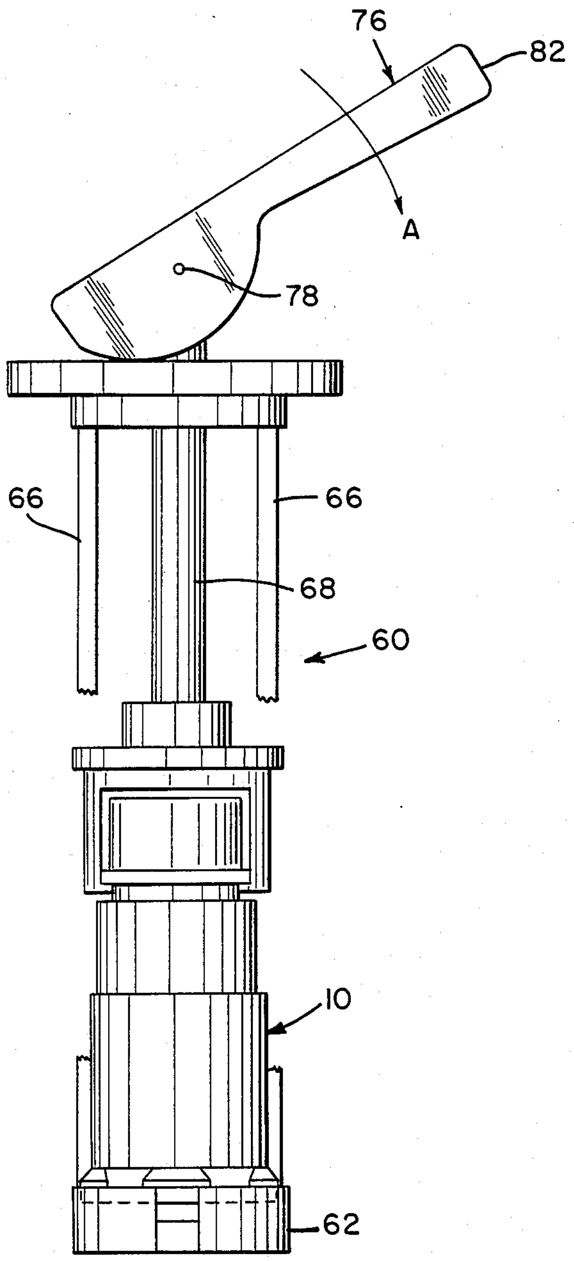

After the threads of the body 12 have been disengaged from the threads or projections of the bottom 14, rotation of the cam handle 76 in a direction opposite the direction of the arrows A results in upward movement of the lifting rod 68. Engagement of the second cam surface 82 with the upper surface of the cover holds the cannister body 12 spaced from the vial 20, but within the ionization chamber, so that the radioactivity of the sample can be measured by the calibration device 96. Upon the completion of the measuring operation, the cam handle 76 is again rotated, as illustrated in FIGS. 6 and 7, to reposition the body 12 on the bottom 14. Provision of the guides 66 facilitates realignment between the body and the bottom. Subsequent rotation of the cam handle in a plane containing the axis of pin 78 reengages the threads of the cannister body with the threads of the cansiter bottom. The cannister and chuck are then removed from the calibration device 96. The cannister 10 is removed from the apparatus 60 by rotating cam handle 76 so that cam surface 80 engages the top surface of cover 70 and lifts the base 14 out of the chuck 62. The lifting rod is then raised, and cam surface 82 is engaged with the top surface of cover 70. The cannister then can be slid off of the lower surfaces 92.

Previously, specific embodiments of the present invention have been described. It should be appreciated, however, that these embodiments have been described for the purposes of illustration only, without any intention of limiting the scope of the present invention. Rather, it is the intention that the invention be limited only by the appended claims.

What is claimed is:

1. A handling apparatus for carrying an assembled cannister shielding a container, the cannister having a cannister body and a base supporting the container, the base being releasably engaged with the cannister body, said handling apparatus comprising:

- chuck means for holding the base of the cannister;
- a cover member spaced from said chuck means;
- frame means coupling said cover member to said chuck means for guiding the movement of the cannister body;
- lifting means located in said cover member for moving the cannister body relative to the base of the cannister within the space defined between the cover member and said chuck means; and
- engaging means for operatively securing the lifting means to the cannister body.

2. The apparatus of claim 1 wherein said lifting means comprises:

- a lifting ring engageable with an upper portion of the assembled cannister so that rotation of the lifting ring rotates the upper portion of the cannister; and
- a lifting rod having a lower end connected to the lifting ring, said lifting rod being movable between:
  - (a) a first raised position in which the cannister is engaged with said lifting ring and spaced from said chuck means;
  - (b) a lowered position in which the cannister base is received in said chuck means; and
  - (c) a second raised position in which the cannister body is separated from the base.

3. A handling apparatus according to claim 2, wherein said frame means includes a connecting rod interconnecting said cover member with said chuck means, said lifting rod extending through an opening in said cover member.

4. A handling apparatus according to claim 2, further comprising a cam handle pivotally connected to an upper end of said lifting rod, said cam handle having a cam surface engaged with said cover member so that rotation of said cam handle in a plane containing the axis of said lifting rod controls raising and lowering of said lifting rod.

5. A handling apparatus for carrying an assembled cannister shielding a container, the cannister having a cannister body and a base supporting the container, the base being releasably engaged with a lower edge of the cannister body by relative rotation between the body and base, said handling apparatus comprising:
a chuck for receiving a base of an assembled cannister and for preventing rotation of the received base;
a lifting ring engageable with an upper portion of the assembled cannister so that rotation of the lifting ring rotates the upper portion of the cannister;
a lifting rod having a lower end connected to the lifting ring; and
frame means extending upwardly from said chuck and guiding movement of said lifting rod, said lifting rod being movable between:
(a) a first raised position in which the cannister is engaged with the lifting ring and a previously engaged cannister is separated from the lifting ring,
(b) a lowered position in which the cannister base is received in said chuck and the cannister body is engaged with and disengaged from the base by rotation of said lifting ring, and
(c) a second raised position in which the disengaged cannister body is separated from the base so that the container is unshielded from the cannister to thereby permit measurement of the radioactivity of a substance within the container.

6. A handling apparatus according to claim 5, wherein said frame means includes a top cover and a connecting rod interconnecting said top cover with said chuck, said lifting rod extending through an opening in said top cover.

7. A handling apparatus according to claim 6, further comprising a cam handle pivotally connected to an upper end of said lifting rod, said cam handle having a cam surface engaged with said top cover so that rotation of said cam handle in a plane containing the axis of said lifting rod controls raising and lowering of said lifting rod.

8. A handling apparatus according to claim 5, wherein said cannister base comprises a bottom cap engageable with the cannister body, and a container holder received in the bottom cap, the container holder having a recess formed therein for receiving a container.

9. A handling apparatus according to claim 8, wherein said container holder is releasably engaged with said bottom cap whereby said container holder is removable from said bottom cap so that a container holder having a recess shaped to receive a particular size container is positionable in said bottom cap.

10. Method of determining the radioactivity of a sample contained in a container comprising:
positioning a container for a radioactive sample in a base of a cannister;
positioning a cannister body over the container and rotating the cannister body and base with respect to each other so that the base and lower edge of the body are releasably engaged with each other to thereby form an assembled cannister providing shielding for a sample in the container;
engaging an upper portion of the assembled cannister with a lifting ring of a handling device so that rotation of the lifting ring rotates the cannister body, the lifting ring being carried by a lifting rod of the handling device, the lifting rod being in a raised position when the lifting ring is engaged with the cannister;
lowering the lifting rod so that the cannister base is received in a chuck of the handling device, the chuck engaging the cannister base and preventing rotation thereof;
positioning the assembled cannister and chuck of the handling device in a chamber of a calibration device;
rotating the lifting ring so that the cannister body is rotated with respect to the cannister base and disengaged from the base;
raising the lifting rod to thereby separate the cannister body from the cannister base and expose the container;
measuring the radioactivity of the sample in the container;
lowering the lifting rod and rotating the lifting ring so that the lower edge of the body is releasably engaged with the cannister base; and
removing the chuck and assembled cannister from the calibration device.

11. Method according to claim 10, wherein said lifting ring is rotated by rotating said lifting rod.

12. Method according to claim 10 or 11, wherein said lifting rod has a lower end connected to said lifting ring and an upper end connected to a cam handle, the cam handle having a cam surface engageable with a top cover of the handling device, said method further comprising rotating said cam handle in a first direction to lower the lifting rod and rotating said cam handle in a direction opposite said first direction to raise the lifting rod.

13. Method according to claim 12, further comprising rotating said cam handle about the axis of the lifting rod to thereby rotate the lifting ring.

14. Method according to claim 10, wherein the cannister body remains in the interior of the calibration device during measurement of radioactivity.

* * * * *